United States Patent [19]
Balkenbush

[11] Patent Number: 5,363,586
[45] Date of Patent: Nov. 15, 1994

[54] DUAL-GRIP FISHING ROD HANDLE

[76] Inventor: James W. Balkenbush, 2805 Silverglade, Oklahoma City, Okla. 73120

[21] Appl. No.: 112,962

[22] Filed: Aug. 30, 1993

[51] Int. Cl.⁵ ............................................. A01K 87/00
[52] U.S. Cl. ............................................ 43/23; 43/25
[58] Field of Search ........................... 43/18.1, 23, 25

[56] References Cited

U.S. PATENT DOCUMENTS

| | | | |
|---|---|---|---|
| D. 256,835 | 9/1980 | Weise, Jr. | D22/23 |
| 1,927,576 | 9/1933 | Smith | 242/84.5 |
| 2,065,153 | 12/1936 | Proudfit | 43/25 |
| 2,084,931 | 6/1937 | Williams | 43/23 |
| 2,149,837 | 3/1939 | Browne | 43/23 |
| 2,303,668 | 12/1942 | Tilbury | 43/25 |
| 2,447,720 | 8/1948 | Thomas | 43/18 |
| 2,514,929 | 7/1950 | Brandt | 43/25 |
| 2,547,655 | 4/1951 | Mullins | 43/23 |
| 2,653,406 | 9/1953 | Grabiak et al. | 43/25 |
| 2,899,768 | 8/1959 | Steinauer | 43/25 |
| 3,296,732 | 1/1967 | Magnus | 43/23 |
| 3,372,509 | 3/1968 | Arsenault | 43/21.2 |
| 3,803,742 | 4/1974 | Foster | 43/4 |
| 4,429,481 | 2/1984 | Handa | 43/25 |
| 4,631,853 | 12/1986 | Brackett et al. | 43/23 |
| 4,646,462 | 3/1987 | Ohmura | 43/23 |
| 4,651,461 | 3/1987 | Williams | 43/23 |
| 4,697,376 | 10/1987 | Brackett et al. | 43/23 |
| 4,817,324 | 4/1989 | Brackett et al. | 43/23 |
| 4,845,879 | 7/1989 | Urso | 43/18.1 |
| 4,848,022 | 7/1989 | Ozeki et al. | 43/23 |
| 4,860,483 | 8/1989 | Hlad | 43/18.1 |

Primary Examiner—Kurt Rowan
Attorney, Agent, or Firm—Dougherty, Hessin, Beavers & Gilbert

[57] ABSTRACT

A fishing rod handle for providing a more comfortable and efficient grip during retrieving includes two distinct grips, one to be utilized during the casting motion and a separate grip to be utilized during the retrieving motion. The handle includes a reel seat on which a fishing reel is mounted, and a casting grip defined on the handle behind the reel position. The handle further includes a retrieving grip which is attached to the handle forward of the reel. The retrieving grip includes a support segment which extends upwardly from the handle, and a gripping segment which extends rearward from the support segment, so that the gripping segment is positioned above the fishing reel. This configuration is advantageous in that it provides the fisherman with a gripping location which facilitates improved balance, and which allows the fisherman to more comfortably and efficiently overcome the difficulties incurred due to the opposing upward and downward forces created during hook setting and fish retrieving.

19 Claims, 5 Drawing Sheets

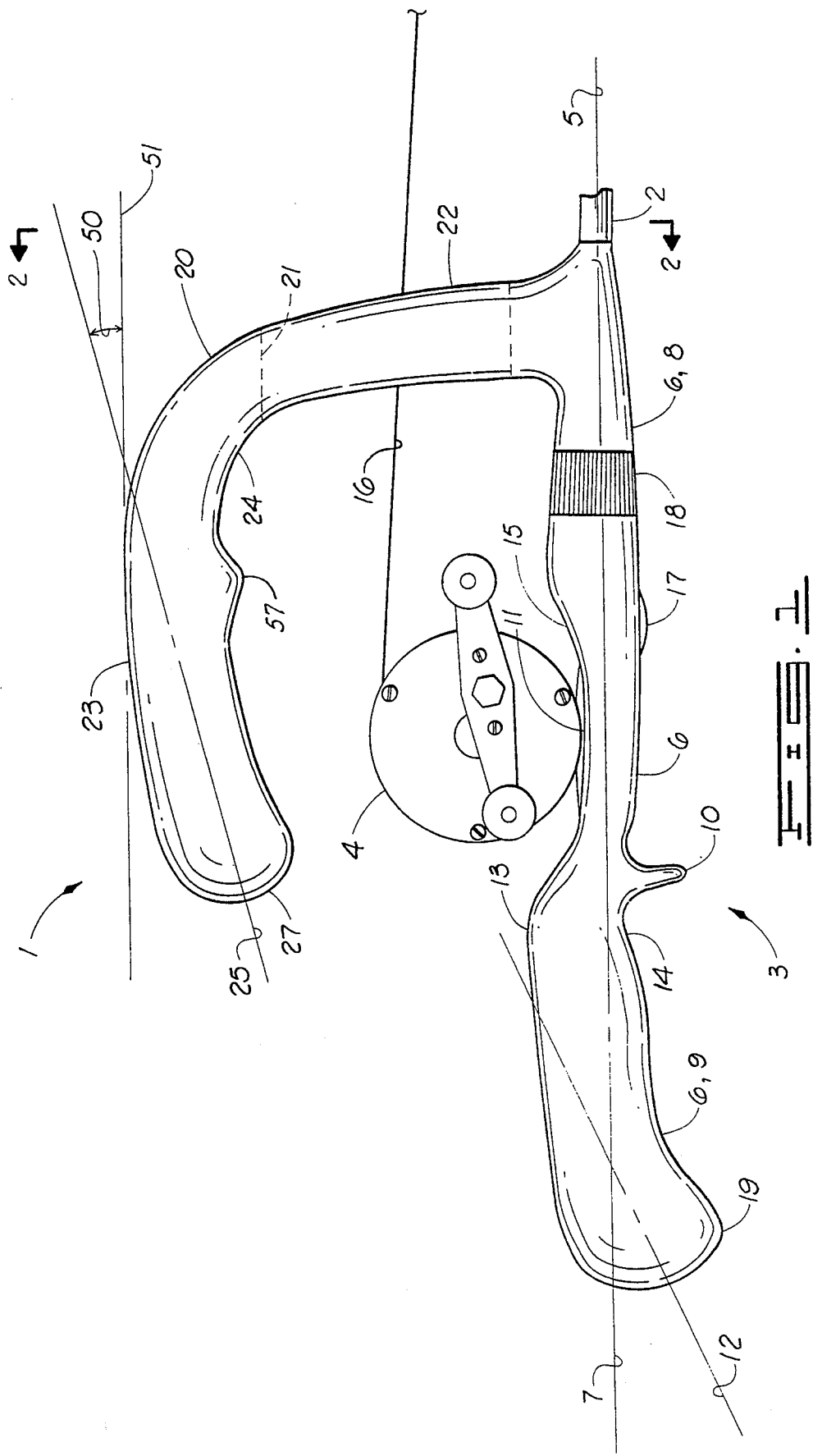

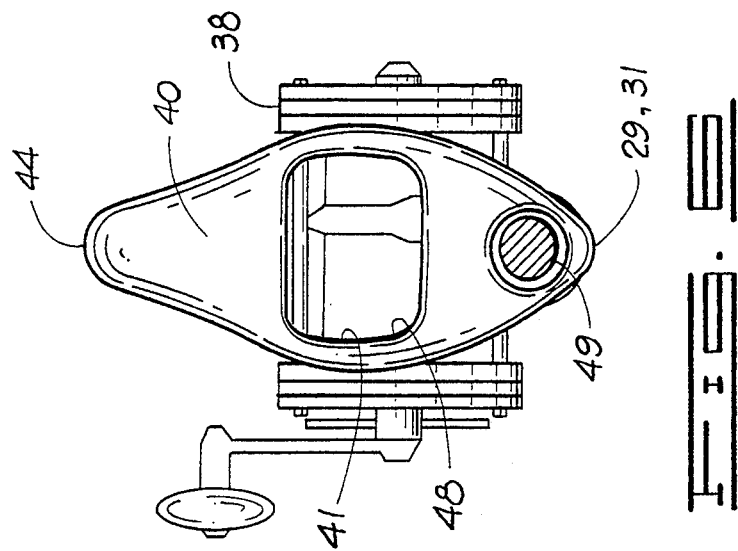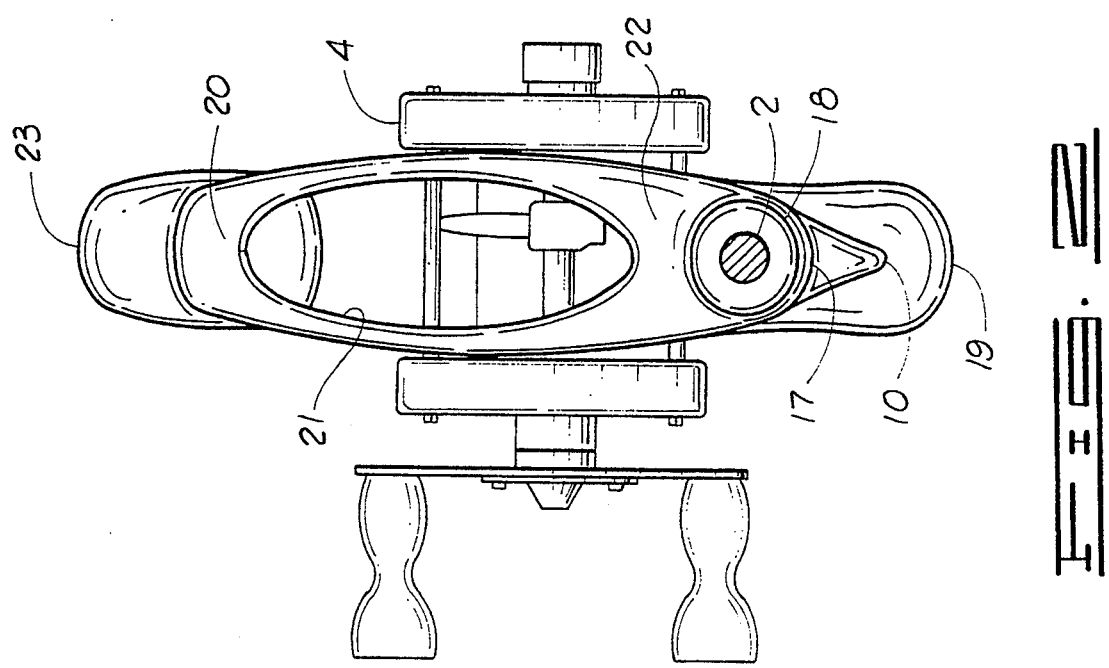

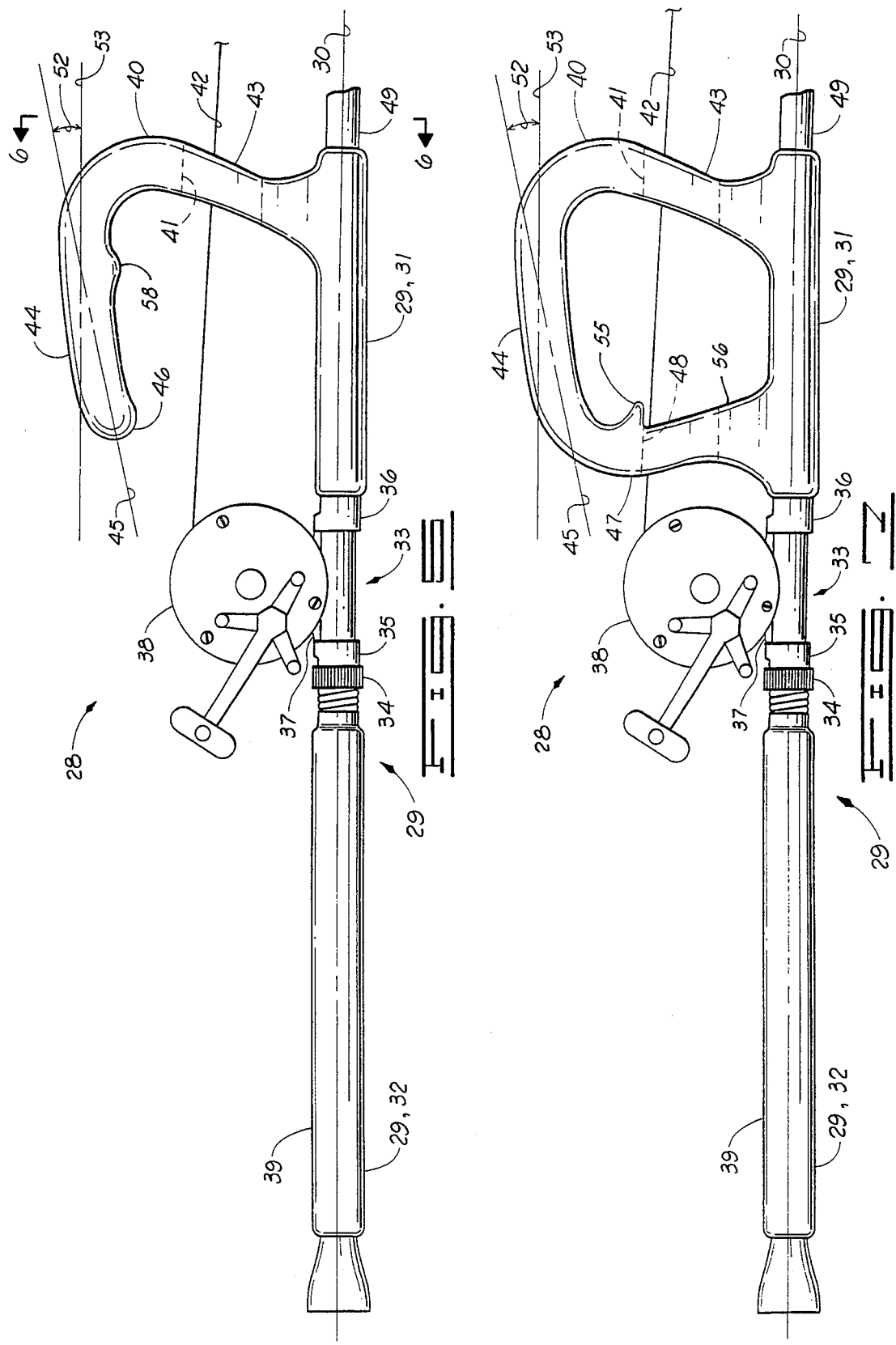

DUAL-GRIP FISHING ROD HANDLE

BACKGROUND OF THE INVENTION

The present invention relates generally to a handle for a fishing rod. More particularly, but not by way of limitation, the invention relates to a fishing rod handle having two separate handles, one which is primarily utilized during casting and another which is primarily utilized during the retrieving motion.

The standard rod and reel assembly typically consists of a fishing rod with a handle secured to the rear of the rod. The handle of the rod forms a substantially straight line from the rear end of the handle to the forward end of the rod. A fishing reel, having fishing line wound thereon, is typically mounted on the upper surface of the handle. The portion of the handle rearward of the reel is grasped by the fisherman during casting and likewise, is used for setting the hook on a fish as well as a retrieving handle when retrieving a fish and/or the fishing line. Although this configuration works well for casting, it creates difficulties during hook setting and retrieving.

When a fisherman sets a hook, retrieves a fish, or retrieves fishing line using a standard rod and reel assembly, the entire weight of the rod and reel assembly is located forward of the hand grasping the handle. This creates an imbalance which is awkward and tiring, and gives little control when setting a hook or retrieving a fish. Additionally, it is difficult for the fisherman to apply sufficient hook setting and retrieving pressure. In an effort to overcome this imbalance, and to achieve better leverage, the fisherman is forced to move the hand forward to grasp the reel and handle together in what is commonly called the "palming" position. Alternatively, the fisherman may grasp the rod forward of the reel in order to apply added pressure and leverage. However, the added weight and pull created during hook setting or when a fish is being retrieved causes additional difficulties which can not be eliminated by moving the hand which grasps the handle.

When setting a hook and retrieving a fish, there are opposing upward and downward forces created by the upward pull of the fisherman and the opposing downward pull of the fish. Because the reel is mounted above the rod on the standard rod and reel assembly, upward pressure on the rod results in a downward pressure on the reel. The opposing forces tend to cause the reel to rotate to the left or right, toward a position beneath the rod. In other words, the downward force on the reel tends to pull the reel underneath the rod. Palming the reel or grasping the rod forward of the reel relieves some of the difficulties associated with hook setting and applying adequate upward pressure to retrieve a fish; however, it does not eliminate the reel rotation problem, and a fisherman using such positions must exert extra pressure on the rod or reel to resist this rotation. In addition, the arm grasping the rod forward of the reel must be held in an awkward position to avoid the fishing line which extends from the reel. Otherwise, the line can come into contact with the arm holding the rod, creating the possibility of cuts and abrasions.

The fisherman who "palms" the reel to eliminate some of the difficulties inherent with the standard fishing rod assembly must place the palming hand around the reel and the rod handle, a position which is cumbersome and unnatural. Although the palm of the hand can resist the tendency of the reel to rotate toward the palming hand, the tendency to rotate in the opposite direction can be opposed only by squeezing the reel, with the thumb on top of the reel. Additionally, the palming hand and the reel may be wet, increasing the tendency for the reel to slip from the grasp.

The difficulties associated with the standard fishing rod assembly exist not only in bait casting rod and reels, but in deep sea rod and reel assemblies as well. Though palming is not a method commonly used by deep sea fisherman, the deep sea fisherman must place his hand forward of the reel to exert adequate upward pressure on the rod and reel assembly. The reel rotation problem is exaggerated with deep sea rod assemblies due to increased downward forces being applied by larger fish. Additionally, the fishing line moves farther away from the center of the spool on the deep sea reel, thus creating a greater tendency to rotate the reel downward as the line moves back and forth across the reel spool. Extra effort must be used to resist such rotation. This extra effort is awkward and tiring. The tendency of the rod and reel to rotate and the difficulties associated therewith are compounded by the fact that the fisherman must bend the grasping arm to avoid coming into contact with the fishing line.

The instant fishing rod handle has been specifically designed to address the difficulties set forth herein and to provide a fishing rod handle which provides the fisherman with comfort and efficiency during the hook setting and retrieving motions.

SUMMARY OF THE INVENTION

The present invention is directed to a fishing rod and handle which makes fishing more comfortable, more efficient and which is easier to control than the standard fishing rod assembly. An objective of the invention is to eliminate the difficulties experienced when setting the hook and retrieving a fish with the standard configuration rod and reel assembly. More specifically, it is the objective of this invention to provide a rod handle which can be comfortably grasped during hook setting and retrieving. Another objective is to provide a handle which allows the fisherman to easily apply sufficient hook setting and retrieving pressure, and to more efficiently and effectively oppose the downward forces experienced when setting a hook and retrieving a fish. A further objective is to provide a rod handle which eliminates the problem of reel rotation and the difficulties associated therewith.

One embodiment of the present invention comprises a fishing rod handle with a rod shaft secured to the forward end of the handle. The handle essentially consists of an elongated body which has a forward end, a rear end, an upper surface and a lower surface. A reel seat is defined on the upper surface of the handle. The handle also has a means for attaching a fishing reel. The handle further includes a casting grip, rearward of the reel seat and a retrieving grip forward of the reel seat. The retrieving grip is comprised of a support segment which extends upwardly from the handle and a retrieving grip handle which extends rearward from the support segment. The support segment has an aperture defined therein so that fishing line extending from a fishing reel attached to the handle can pass through the retrieving grip.

Numerous objects, features, and advantages of the present invention will be readily apparent to those skilled in the art upon a reading of the following disclosure when taken in conjunction with the accompanying drawings.

BRIEF DESCRIPTION OF THE DRAWINGS

FIG. 1 is a side view showing a preferred embodiment of the fishing rod and handle assembly.

FIG. 2 is forward end view of the handle of FIG. 1.

FIG. 5 shows an embodiment of a fishing apparatus according to the present invention.

FIG. 6 shows a forward end view of the embodiments shown in FIGS. 5 and 7.

FIG. 7 shows a side view of another embodiment of the fishing apparatus of the present invention.

DESCRIPTION OF THE PREFERRED EMBODIMENT

Figure 3:
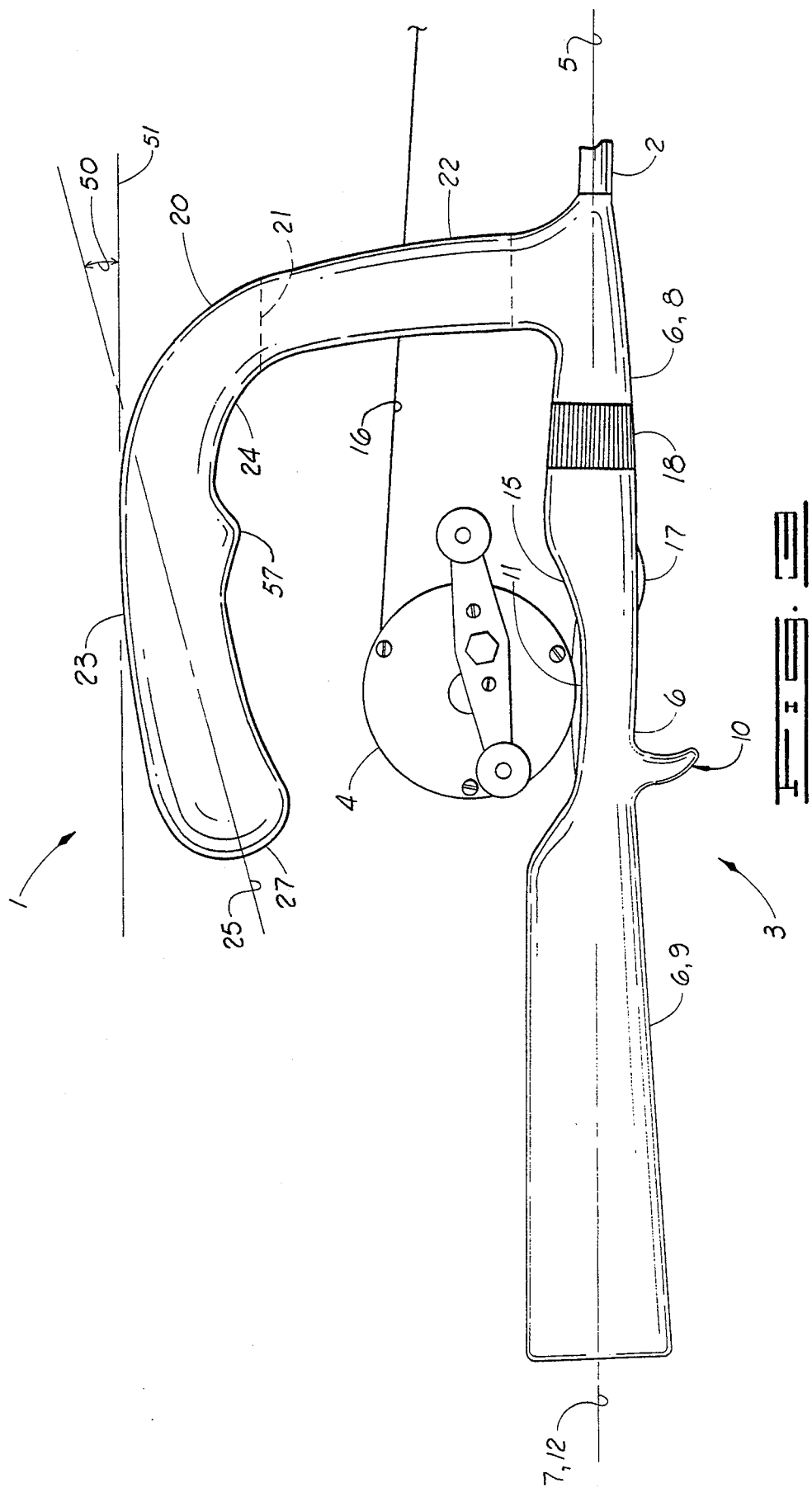
FIG. 3 is a side view showing an alternative embodiment of the handle shown in FIG. 1.

Referring now to the drawings, and particularly to FIG. 1, a fishing rod assembly 1 according to the present invention includes a fishing rod shaft 2, having a longitudinal central axis 5, a rod handle 3 and a fishing reel 4. The fishing reel 4 has fishing line 16 extending forward therefrom. The rod handle 3 includes an elongated body 6 which has a longitudinal central axis 7. The longitudinal central axis 7 is substantially co-axial with the longitudinal central axis 5 of the rod shaft 2. The handle further includes a forward end or portion, 8 and a rear end or portion, 9. The rear portion 9 has a longitudinal central axis 12. The handle also includes an upper surface 13 and a lower surface 14. The upper surface is the surface which faces up when the rod is held in a generally horizontal position, with the reel on top. A finger trigger 10 extends downwardly from the lower surface 14.

A reel seat or reel receiving segment 15, having a longitudinal midpoint 11, is defined on the upper surface of the handle. A reel attachment means is included to secure the fishing reel 4 to the reel seat. The reel attachment means may consist of a threaded screw 17 which threads through the lower surface 14 of the handle 3 into a locking bar (not shown) which secures the fishing reel in place. Alternatively, the reel attachment means may consist of a threaded lock ring 18 which when rotated causes a locking mechanism (not shown) to clamp the reel in place. The methods described herein for attaching the reel to the handle are well known in the art and are not intended to be limiting.

A casting handle or casting grip 19 is defined on the handle 3 rearward of the reel seat. The rod handle 3 also includes a retrieving handle or cantilevered retrieving grip 20 fixed to the elongated body 6 forward of the reel seat. The retrieving handle 20 includes an opening 21, shown more clearly in FIG. 2. The opening 21 allows fishing line 16 extending from the fishing reel 4 to pass forward through the retrieving handle 20.

The retrieving handle includes a first support segment, or retrieving grip support 22 which extends upwardly from the handle 3. The opening 21 is defined in the first support segment. The retrieving handle also includes a gripping segment 23 which extends rearwardly from the upper end 24 of the first support segment 22. The gripping segment 23 may also be described as a retrieving grip handle. Gripping segment 23 also includes a downwardly extending ridge 57. Ridge 57 helps to provide the fisherman with a secure grasp of the gripping segment 23. The gripping segment includes a longitudinal central axis 25, and is positioned substantially over the reel seat 15 so that the termination point 27 of gripping segment 23 is located rearward of a longitudinal midpoint 11 of the reel seat 15. The longitudinal central axis 25 of the gripping segment 23 is inclined with respect to the longitudinal central axis 7 of the elongated body 6 so that an acute angle 50 is formed between longitudinal central axis 25 of gripping segment 23 and a line 51 parallel to longitudinal axis 7 and longitudinal axis 5. The angle is such that the gripping segment may be comfortably grasped during the retrieving motion and is preferably between 1° and 20°. The angle is more preferably between 5° and 10°, and even more preferably is approximately 7°.

In FIG. 1, the longitudinal central axis 12 of the rear portion 9 is shown to be substantially parallel to the longitudinal central axis 25 of the gripping segment 23. In an alternative embodiment shown in FIG. 3, the longitudinal central axis 12 of the rear portion 9 may be substantially parallel to and co-axial with the longitudinal central axis 7 of the elongated body and the longitudinal central axis 5 of the fishing rod shaft 2.

Figure 4:
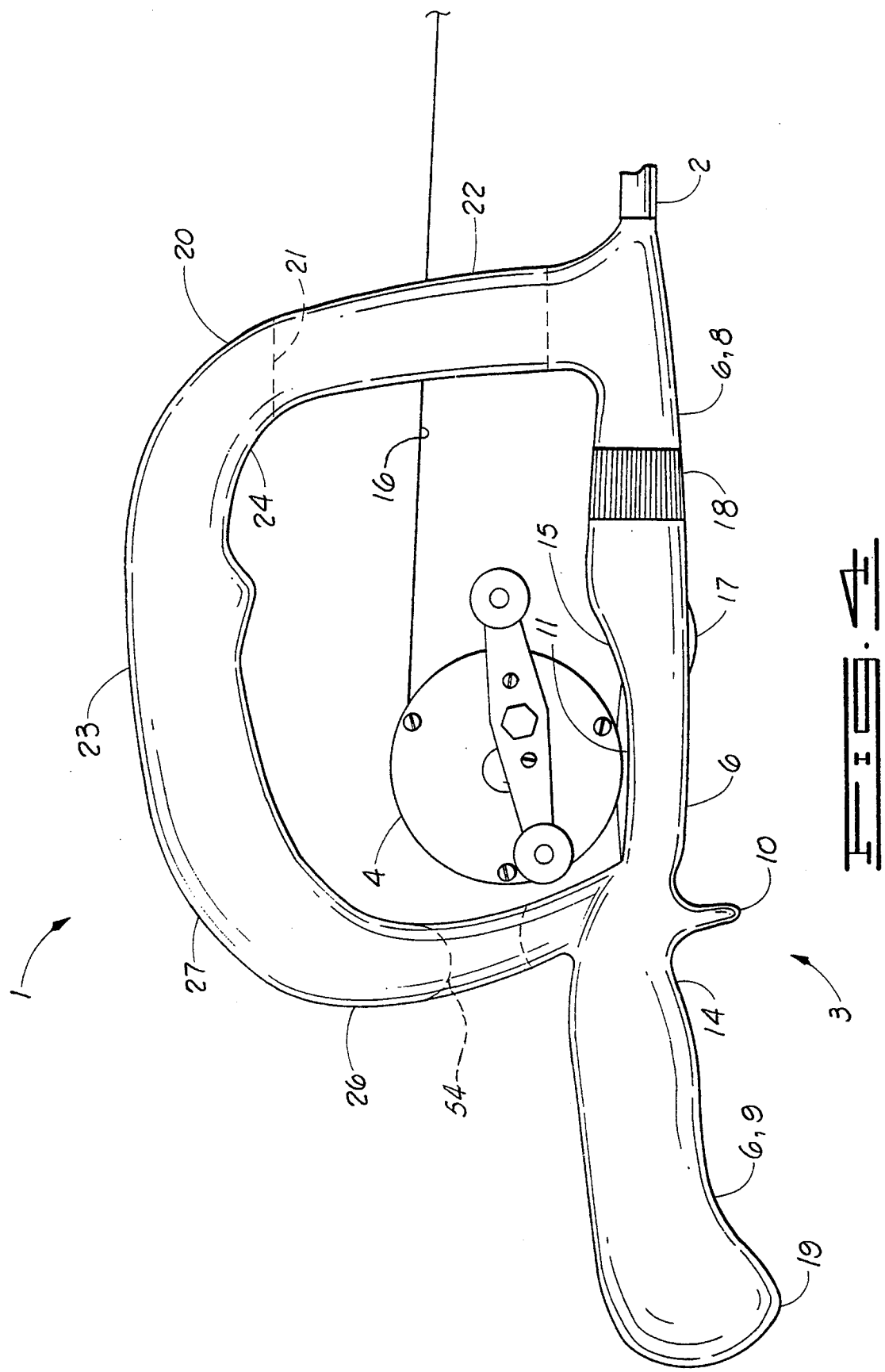
FIG. 4 shows a side view of another alternative embodiment of the fishing rod handle shown in FIG. 1.

Another alternative embodiment of the present invention is shown in FIG. 4. The embodiment of FIG. 4 is virtually identical to that shown in FIG. 1, but further includes a second support segment 26. The second support segment 26 extends upwardly from casting handle 19 and is attached to gripping segment 23 at its termination point 27. An opening 54 is defined in second support segment 26. The opening 54 provides access to the reel through the second support segment 26 so that the reel can be manipulated.

The inclusion of a retrieving handle as described above eliminates the problems associated with the standard rod and reel assembly. When using the fishing rod assembly of the present invention, a fisherman would utilize casting handle 19 and finger trigger 10 when casting a lure in the same manner as with a standard rod and reel assembly. However, when retrieving a lure, setting a hook or retrieving a fish, retrieving handle 20 is grasped while the opposite hand cranks the reel 4. The retrieving handle provides improved balance and better allows the fisherman to resist the downward force experienced when a fish is hooked and retrieved. In addition, the tendency for the reel to rotate left or right toward a position beneath the rod due to downward forces is eliminated when the retrieving handle is used. The retrieving handle generally provides a more comfortable and more efficient retrieving position.

Additional embodiments of the present invention are shown in FIGS. 5–7. FIG. 5 shows a fishing apparatus 28 which includes a handle 29 having a longitudinal central axis 30, a forward end 31 and a rear end 32. The handle 29 includes a fishing reel attachment means 33. The attachment means 33 may consist generally of a circular threaded clamp ring 34 and securing rings 35 and 36. Securing rings 35 and 36 are shaped to receive the base 37 of a fishing reel 38. The attachment means described herein is well known in the art and is not intended to be limiting.

The handle further includes a rear grip 39 positioned rearward of the fishing reel attachment means. A forward grip 40 is secured to the handle forward of the reel attachment means. The forward grip 40 has an opening 41 defined therein for allowing fishing line 42 extending from reel 38 to pass therethrough. The opening 41 is shown more clearly in FIG. 6.

The forward grip 40 includes a first leg 43 attached to the handle forward of the reel attachment means 33, and a hand grip 44. The opening 41 for allowing fishing line to pass through the forward grip is defined in the first leg 43. The hand grip 44 has a longitudinal central axis 45 and extends rearwardly from first leg 43 until it terminates at its termination end 46. The hand grip 44 may also include a downwardly extending ridge 58 to provide a more secure grasp of hand grip 44. The termination end 46 is located forward of the reel attachment means.

In an alternative embodiment shown in FIG. 7, the forward grip is further comprised of a second leg 47 which is attached at one end to forward end 31 and at a second end to the termination end 46 of the hand grip. The second leg 47 is substantially coplanar with the first leg and has an opening 48 defined therein for allowing the fishing line 42 to pass through the second leg. The opening 48 in second leg 47 is in line with the opening 41 in first leg 43. A support ledge 55 extends forward from an inner surface 56 of second leg 47. The ledge 55 is positioned at an upper edge of opening 48. The ledge provides support for the fisherman's hand during retrieving, and prevents the fisherman's hand from sliding down on second leg 47.

In the embodiments shown in FIGS. 5–7, the longitudinal central axis 45 of the hand grip 44 is inclined with respect to the longitudinal central axis 30 of the handle 29 so that an acute angle 52 is formed between longitudinal central axis 45 and a line 53 parallel to the longitudinal central axis 30. The angle should be such that the hand grip may be comfortably grasped when the fishing reel is being utilized to retrieve the fishing line extending therefrom, and is preferably between 1° and 20°. The angle is more preferably between 5° and 15° and is even more preferably approximately 7°. Further included in the apparatus is a fishing rod shaft 49 extending forwardly from the forward end of the handle.

The embodiments shown in FIGS. 5–7 are used much the same as a standard fishing rod during the casting motion. The rear grip 39 is utilized during the casting motion. However, when a lure, or a fish, is being retrieved, the fisherman grasps hand grip 44 while cranking reel 38. Such a position provides comfort, control and eliminates the aforementioned difficulties associated with a standard fishing apparatus.

It is seen that the fishing rod handle of the present invention readily achieves the advantages mentioned herein as well as those inherent therein. While certain preferred embodiments of the present invention have been illustrated and described for purposes of the present disclosure, numerous changes in the size, shape and construction and arrangement of the various components may be made by those skilled in the art which changes are encompassed within the scope and spirit of the present invention as well as defined by the following claims.

What is claimed is:

1. A fishing rod handle comprising:
   an elongated body having a forward end and a rear end, and having an upper surface and a lower surface, said body having a longitudinal central axis;
   a reel seat defined on said upper surface of said body;
   reel attachment means for attaching a fishing reel to said reel seat;
   a casting handle defined on said body rearward of said reel seat;
   a retrieving handle fixed to said upper surface of said body forward of said reel seat, wherein said retrieving handle comprises:
   a first support segment extending upwardly from said elongated body and terminating at an upper end, said first support segment having an aperture defined therein for allowing fishing line to pass forward from said fishing reel through said aperture; and
   a gripping segment extending rearwardly from said upper end of said first support segment, said gripping segment having a longitudinal central axis.

2. The fishing rod handle of claim 1, wherein said gripping segment terminates at a point rearward of a longitudinal midpoint of said reel seat, so that said gripping segment is positioned substantially over said reel seat.

3. The fishing rod handle of claim 2, further comprising a second support segment, fixed at a first end to said casting handle and extending upwardly therefrom, and fixed at a second end to said gripping segment at its termination point, said second support segment having an opening defined therein for allowing access to said fishing reel.

4. The fishing rod handle of claim 1, wherein said longitudinal central axis of said gripping segment is inclined with respect to said longitudinal central axis of said elongated body so that an acute angle is formed between said longitudinal central axis of said gripping segment and a line parallel to said longitudinal central axis of said elongated body.

5. The fishing rod handle of claim 1, wherein said gripping segment of said retrieving handle is substantially parallel to said casting handle.

6. The fishing rod handle of claim 5, wherein said casting handle is inclined downwardly relative to said longitudinal central axis of said elongated body when said longitudinal central axis of said elongated body is horizontal, so that a rear end of said casting handle is displaced downwardly from said forward end of said elongated body.

7. The fishing rod handle of claim 6, further comprising:
   a longitudinal fishing rod shaft extending from the forward end of said elongated body; and
   a fishing reel attached to said reel seat, said fishing reel having fishing line extending therefrom and passing through said aperture defined in said support segment of said retrieving handle.

8. A fishing rod assembly, comprising:
   a rod shaft having a longitudinal central axis;
   a handle secured to said rod shaft, said handle having a forward portion and a rear portion, and having an upper surface and a lower surface, said rear portion having a longitudinal central axis;
   a casting grip formed on said rear portion of said handle;
   a reel receiving segment defined in said upper surface of said handle, said reel receiving segment being positioned between said forward portion and said rear portion of said handle;
   reel attachment means for securing a fishing reel in said reel receiving segment;
   a cantilevered retrieving grip fixed to said forward portion of handle, said retrieving grip comprising:
   a retrieving grip support extending upwardly from said forward portion of said handle, said retrieving grip support having an opening defined therein for receiving fishing line; and a retrieving grip handle having a longitudinal central axis, said retrieving grip handle being cantilevered from said retrieving grip support and extending rearwardly therefrom.

9. The fishing rod assembly of claim 8, wherein said retrieving grip handle is positioned substantially over said reel receiving segment.

10. The fishing rod handle of claim 9 wherein said longitudinal central axis of said rear portion is substantially coaxial with and parallel to said longitudinal central axis of said rod shaft.

11. The fishing rod assembly of claim 9, wherein said longitudinal central axis of said retrieving grip handle is substantially parallel to said longitudinal central axis of said rear portion of said handle.

12. The fishing rod assembly of claim 11, wherein said longitudinal axis of said rear portion is angled so that the rear end of said casting grip is displaced downward from the forward end of said casting grip when said longitudinal central axis of said rod shaft is horizontal.

13. The fishing rod assembly of claim 12, further comprising:
 a fishing reel attached to said reel receiving segment, said fishing reel having fishing line extending therefrom, said fishing line being received in said opening in said retrieving grip support; and
 a finger trigger extending downwardly from said lower surface of said handle.

14. A fishing apparatus comprising:
 a handle having a longitudinal central axis, and having a forward end and a rear end;
 fishing reel attachment means for attaching a fishing reel, located between said forward and rear ends of said handle;
 a rear grip defined on said handle, rearward of said fishing reel attachment means;
 a forward grip secured to said handle forward of said fishing reel attachment means, said forward grip comprising:
 a first leg attached to said handle forward of said fishing reel attachment means and extending outwardly therefrom, said first leg having an opening defined therein for allowing fishing line to pass forward from said fishing reel through said forward grip; and
 a hand grip having a longitudinal central axis, said hand grip being integrally attached at a first end to said first leg and extending rearwardly therefrom, said hand grip having a rear termination end located forward of said reel attachment means.

15. The apparatus of claim 14, wherein said forward grip further comprises a second leg attached at one end to said handle forward of said fishing reel attachment means and at a second end to said termination end of said hand grip, said second leg being substantially coplaner with said first leg and having an opening defined therein for allowing fishing line from said fishing reel to pass through said second leg.

16. The apparatus of claim 15, further comprising a support ledge, extending forward from an inner surface of said second leg, said support ledge being positioned at an upper edge of said opening in said second leg.

17. The apparatus of claim 16, wherein said longitudinal central axis of said hand grip is inclined with respect to said longitudinal central axis of said handle, so that an acute angle is formed between said longitudinal central axis of said hand grip and a line parallel to said longitudinal central axis of said handle.

18. The apparatus of claim 17, further comprising:
 a fishing rod secured to said handle and extending forwardly from said forward end of said handle.

19. The fishing apparatus of claim 18, further comprising:
 a fishing reel attached to said handle, said fishing reel having fishing line extending therefrom and being positioned so that said fishing line passes through said openings in said first leg and said second leg.

* * * * *